(12) United States Patent
Kumar et al.

(10) Patent No.: US 7,778,829 B2
(45) Date of Patent: Aug. 17, 2010

(54) REAL TIME MONITORING AND CONTROL FOR AUDIO DEVICES

(75) Inventors: Vivek Kumar, San Jose, CA (US); Mohammad Zad-Issa, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 939 days.

(21) Appl. No.: 11/591,625

(22) Filed: Nov. 1, 2006

(65) Prior Publication Data

US 2008/0103776 A1 May 1, 2008

(51) Int. Cl.
*G10L 21/02* (2006.01)
*G10L 21/00* (2006.01)
*H04R 3/02* (2006.01)
*H04R 1/10* (2006.01)
*H04B 15/00* (2006.01)

(52) U.S. Cl. .......... 704/228; 704/226; 704/270; 381/73.1; 381/74; 381/94.1

(58) Field of Classification Search .......... None
See application file for complete search history.

(56) References Cited

U.S. PATENT DOCUMENTS

| 7,027,832 | B2 * | 4/2006 | Gum ............ 455/550.1 |
| 7,200,237 | B2 * | 4/2007 | Zhang et al. ......... 381/60 |
| 7,286,673 | B2 * | 10/2007 | Bindner et al. ......... 381/60 |
| 2002/0054689 | A1 * | 5/2002 | Zhang et al. ......... 381/312 |
| 2007/0041589 | A1 * | 2/2007 | Patel et al. ......... 381/73.1 |
| 2008/0025538 | A1 * | 1/2008 | Zad-Issa ......... 381/315 |

\* cited by examiner

*Primary Examiner*—Matthew J Sked
(74) *Attorney, Agent, or Firm*—Brake Hughes Bellermann LLP

(57) ABSTRACT

Various embodiments are disclosed relating to the real-time monitoring and control for audio devices. An apparatus may include a peripheral audio device configured to operate in an operational mode or a debug mode, the peripheral audio device including an audio enhancement logic configured to include at least one tunable parameter. The apparatus may also include the peripheral audio device being further configured to transmit and receive data via a data channel to allow a debug or test to be performed on the peripheral audio device, while operating in the debug mode, and the at least one tunable parameter to be adjusted.

23 Claims, 6 Drawing Sheets

REAL TIME MONITORING AND CONTROL FOR AUDIO DEVICES

BACKGROUND

Wireless communication has become an increasingly popular method for communicating. As wireless signals are transmitted from one device to another, the receiving devices must process the incoming wireless signals to remove noise and other undesired characteristics that may have become embedded in the signal.

Wireless technology, such as Bluetooth, has allowed users to communicate with their mobile cellular handsets through headsets wirelessly linked with the mobile handsets. The headsets may include audio processing used to enhance the quality of the sound traveling between the handset, the headset, and the user.

The audio processing component(s) of the headsets may be encased in a plastic or other casing by a manufacturer. However if a problem arises with regards to the compatibility or tuning of the audio processing components with the headsets and/or another manufacturer's equipment, the casings may need to be opened and the audio processing components may need to be physically replaced to update the audio processing software, algorithm, parameters, etc. In addition to being costly, this opening and resealing of the casings may also introduce new variables into the audio processing and new problems that need to be debugged.

An additional problem may exist if the headset is being used by a user and problem occurs during usage. Often times, bugs may only arise in actual usage of the headset, thus it may be difficult to recreate the debugging issue about which the user is complaining, thus making resolving the debugging issue more difficult and time consuming.

SUMMARY

Various embodiments are disclosed relating to the real-time monitoring and control for audio devices. According to an example embodiment, an apparatus is provided. The apparatus may include a peripheral audio device configured to operate in an operational mode or a debug mode, the peripheral audio device including an audio enhancement logic configured to include at least one tunable parameter. The apparatus may also include the peripheral audio device being further configured to transmit and receive data via a data channel to allow a debug or test to be performed on the peripheral audio device, while operating in the debug mode, and the at least one tunable parameter to be adjusted In another example embodiment, a method is provided. The method may include configuring a peripheral audio device to operate in a debug mode, the peripheral audio device including at least one tunable parameter. The method may also include performing, during debug mode, receiving an audio signal either via an audio channel or as data via a data channel, processing the received audio signal, providing the processed audio signal to a debug device via the data channel, and configuring the at least one tunable parameter based on a control signal received from the debug device via the data channel.

In another example embodiment, a method is provided. The method may include capturing, at a peripheral audio device, audio signals transmitted via an audio channel between a main audio device and the peripheral audio device. The method may also include providing the captured audio signals to a debug device via a data channel between the peripheral audio device and the debug device. The method may also include receiving an adjustment from the debug device associated with the peripheral audio device, the adjustment being based, at least in part, upon the captured audio.

The details of one or more implementations or example embodiments are set forth in the accompanying drawings and the description below. Other features will be apparent from the description and drawings, and from the claims.

DETAILED DESCRIPTION

Figure 1:
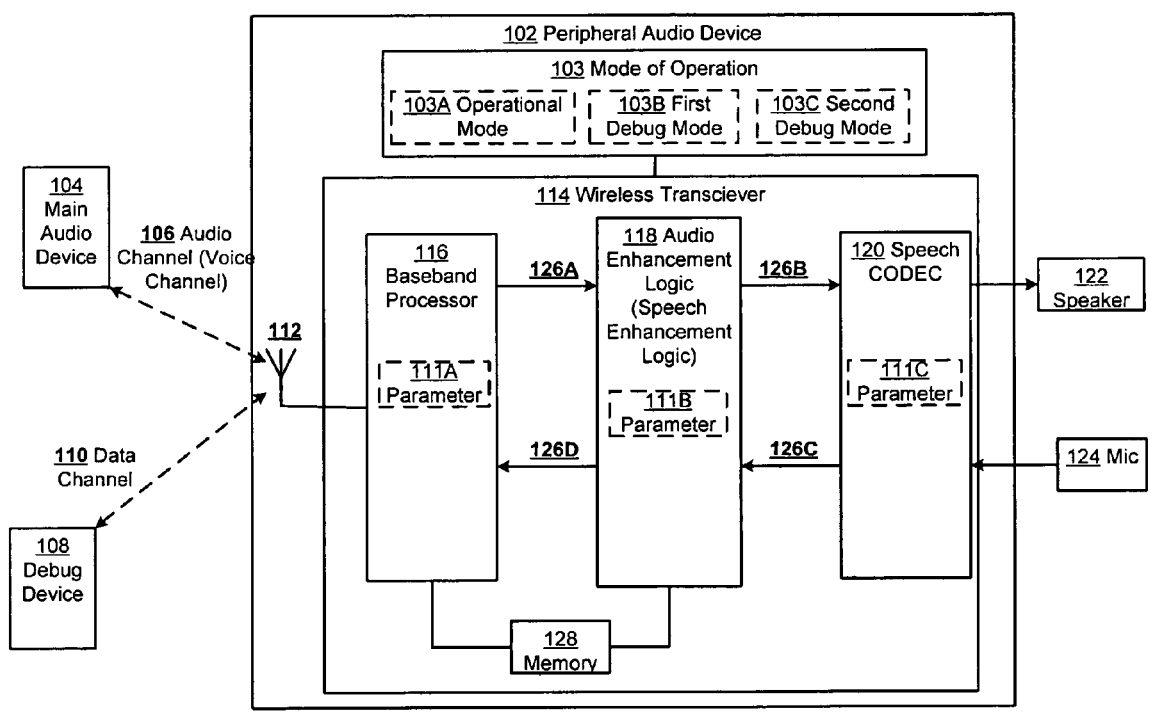
FIG. 1 is a block diagram of an example system 100 for real-time monitoring and controlling for audio devices.

FIG. 1 is a block diagram of an example system 100 for real-time monitoring and controlling for audio devices. In the example of FIG. 1, the system 100 allows an audio device (such as peripheral audio device 102) to be monitored in real-time and controlled via a data link. The audio device (e.g., peripheral audio device 102) may include components configured for speech and/or audio processing, wherein the components may be configured, tuned, and/or debugged by either physically opening the casing of the audio device or wirelessly through a data link. Opening the casing to configure the audio device however may risk altering the speech and/or audio processing of the components by subjecting them to environmental and/or physical variables. Thus, rather than opening the casing of the audio device, a debugging device, such as a computer or other device, may activate the data link and determine and configure the parameters or settings of the audio device and/or its components through the data link, thus obviating the need to physically open the audio device to debug the audio device or determine and/or adjust its parameters, to retrieve status information from the audio device, to download data or firmware/software to the audio device, or perform other tasks on the audio device.

The system 100 may be or may include, for example, a peripheral audio device 102. Peripheral audio device 102 may be an audio device configured to perform speech processing or enhancement on audio transmitted to and received from another audio device or a user, or to perform other audio or speech related functions. In an example embodiment, peripheral audio device 102 may be a wireless or hands-free headset, which may be Bluetooth compatible, and may include a speech enhancement or speech processing capability. However, this is merely an example, and peripheral audio device may be any type of audio device. Although many of the examples presented in regards to FIG. 1 are presented in the context of speech, speech-related data and speech processing, it should be understood that these are exemplary only and that such examples may also apply to others types of audio, audio-data, and audio processing such as music (e.g. MP3).

Peripheral audio device 102 may include a mode of operation 103. Mode of operation 103 may determine what device(s) peripheral audio device 102 communicates with and how the communication may take place. According to an example embodiment, peripheral audio device 102 may have three modes of operation, including an operational mode 103A, a first debug mode 103B, and a second debug mode 103C. In another example embodiment, peripheral audio device 102 may have additional, fewer, or different modes of operation. In an example embodiment, the modes of operation 103A-C may be toggled between by pressing a button combination on peripheral audio device 102, by signal from another device, or by another suitable toggling method.

During operational mode 103A, peripheral audio device 102 may exchange audio and/or audio-related data with another audio device via an audio channel. In an example embodiment, peripheral audio device 102 may communicate over a bi-directional speech channel. For example, peripheral audio device 102 may exchange speech and speech-related data with a main audio device 104 via an audio or voice channel 106. In another example embodiment, peripheral audio device 102 may exchange other audio, such as music, with main audio device 104 via an audio channel 106.

Main audio device 104 may be an audio device configured to exchange audio signals with another audio device. For example, main audio device 104 may transmit speech to and receive speech from peripheral audio device 102. In an example embodiment, main audio device 104 may be a cellular or mobile phone configured to communicate with peripheral audio device 102. In an example embodiment, main audio device 104 may be a Bluetooth compatible audio device, or may adhere to another wireless standard. These are merely examples, and main audio device may be any type of audio related device and as such may exchange other types of audio signals, in addition to or in lieu of speech signals, with another audio device.

In an example embodiment, main audio device 104 may be a Bluetooth compatible mobile phone configured to communicate with peripheral audio device 102, which may be a Bluetooth compatible headset. Then for example, main audio device 104 may transmit audio signals, such as speech signals, to peripheral audio device 102, e.g., via audio (or voice) channel 106. The speech signals may include speech, such as speech received from a user who is connected to main audio device 104 via a communications network, and speech-related data, such as volume up/down controls. Peripheral audio device 102 then for example may process the speech signals, including the speech and speech-related data, received from main audio device 104 and transmit back to main audio device 104 response speech signals. The response speech signals may also include speech, such as speech received from a user who is using peripheral audio device 102 to communicate with main audio device 104, and speech-related data, such as a beep indicating an adjustment of the volume control. The communication between main audio device 104 and peripheral audio device 102 may occur via audio channel 106, for example, which may include speech and/or data.

Audio channel 106 may be a wireless channel, link, or other connection configured to transmit audio and/or data between two or more wireless devices. For example, audio channel 106 may be a voice channel 106 configured to transmit speech and speech-related data between main audio device 104 and peripheral audio device 102. Voice channel 106 may be a bi-directional synchronous voice channel. In an example embodiment, voice channel 106 may be a Bluetooth channel, such as a synchronous connection oriented (SCO) channel or an enhanced SCO (eSCO) channel, configured to transmit speech between main audio device 104 and peripheral audio device 102 (both of which may be Bluetooth compatible devices).

In an example embodiment, voice channel 106 may include a limited quality of service. For example, voice channel 106 may not have error correction, but may attempt a limited number of retries in sending a packet prior to dropping the packet. In another example embodiment, voice channel 106 may compress the speech and/or speech-related data prior to transmission, wherein the compression may introduce errors into the speech.

During first debug mode 103B, peripheral audio device 102 may buffer, in real-time, audio such as speech and/or speech-related data as it is exchanged with another audio device (e.g., main audio device 104) via an audio channel (e.g., voice channel 106). As such, this may allow peripheral audio device 102 to capture errors or debugging issues as they are occurring while in communication with the other audio device. Peripheral audio device 102 may then provide the buffered speech via a data channel (e.g., data channel 110) to a debug device 108 for debugging, wherein according to an example embodiment, debug device 108 may adjust or tune peripheral audio device 102, by adjusting one or more speech related parameters or other aspects of peripheral audio device 102, for example.

Debug device 108 may be a device, e.g. a computer, laptop, or other device, configured to perform a debugging (or testing or evaluation) operation on an audio device through an exchange of data signals. For example, debug device 108 may configure, tune, and/or debug peripheral audio device 102. In an example embodiment, during first debug mode 103B peripheral audio device 102 may buffer audio signals, such as speech signals, received via voice channel 106 from main audio device 104, and may process the received speech signals. Then, for example, peripheral audio device 102 may provide the buffered speech and/or processed speech signals, to debug device 108. Debug device 108 may then for example determine an adjustment to be made to peripheral audio device 102, e.g., based on the sound quality and/or characteristics of the buffered speech and/or processed speech signals. Then for example, debug device 108 may adjust peripheral audio device 102 wirelessly over a data channel (e.g., data channel 110). Debug device 108 may, for example, adjust or tune one or more parameters of peripheral audio device 102 by transmitting a control signal, the one or more updated parameters, or other information to peripheral device 102, e.g., via data channel 110.

During second debug mode 103C, peripheral audio device 102 may receive test audio data (or audio signals) from a debug device via a voice channel and/or data channel (e.g., via voice channel 106 and/or data channel 110). As such, this may allow, for example, the speech or audio processing of peripheral audio device 102 to be tested with a known set of inputted speech signals. Peripheral audio device 102 may then process the received speech signals and then provide the processed test speech data to the debug device 108 e.g., via data channel 110, wherein the debug device may adjust at least part of peripheral audio device 102 based at least in part on processed test speech data received. For example, debug device 108 may transmit a control signal or updated parameters or other information via data channel 110 to tune or adjust the performance of peripheral audio device 102, download updated firmware or software, or other information.

For example during second debug mode 103C, debug device 108 may provide audio data (e.g., speech signals) to a component (e.g. a memory buffer or register) associated with peripheral audio device 102, wherein the component may be involved in one or more stages of audio or speech processing. Peripheral audio device 102 may then process the speech data and then transmit the processed speech data (or processed speech signals) to debug device 108 via data channel 110. Then for example, debug device 108 may receive the processed speech data, after undergoing one or more stages of speech processing by peripheral audio device 102. Based on the received processed speech data, debug device 108 may transmit a signal via data channel 110 to, for example, tune or adjust one or more parameters of peripheral audio device 102. The adjustment may be determined, for example, by comparing the provided speech data to the processed speech data and/or analyzing the quality of the processed speech data. In another example embodiment, the operation of debug device 108 during first debug mode 103B and the second debug mode 103C and be combined and/or modified.

Debug device 108 may also receive and/or request status information regarding peripheral audio device 102. The status information may include, for example, the load of peripheral audio device 102, e.g., the percentage of time peripheral audio device 102 was idle over a specified time period, current audio parameters in use by peripheral audio device 102, or other status information. In an example embodiment, the status information may be found in one or more parameters 111A, 111B and/or 111C of peripheral audio device 102, one or more of which may be adjusted by debug device 108.

Parameters 111A,B,C may be parameters associated with the processing of audio and/or data by an audio device. For example speech, including speech and speech-related data, received by peripheral audio device 102 may undergo speech processing involving parameters 111A-C. In another example embodiment, parameters 111A-C may be associated with other audio processing, such as music for example. Parameters 111A-C may be associated with one or more components of peripheral audio device 102, and are only shown as examples of where parameters may exist within peripheral audio device 102, other embodiments may include additional/fewer parameters 111A-C in varying locations.

In an example embodiment, debug device 108 may compare parameters 111A-C with the audio (e.g., speech) received from peripheral audio device 102 to determine an adjustment of peripheral audio device 102 that may be made to improve the speech processing and/or resultant speech. For example, debug device 108 may determine, or may be used to determine, that parameter 111B needs to be adjusted to reduce excess noise found in the buffered speech. Then for example, debug device 108 may send data or a control signal over data channel 110 to adjust parameter 111B. The control signal may include for example the new value for parameter 111B or the adjustment that may be need to made to parameter 111B. In another example embodiment, debug device 108 may provide the required adjustment to peripheral audio device 102 or transmit one or more updated parameters 111A, 111B, and/or 111C. Each of parameters 111A, B and C may each include one or more parameters. For example, parameters 111B may include a plurality of parameters used for speech and/or other audio enhancement. The control signal, e.g., which may include one or more updated parameters or other information, may be provided to peripheral audio device 102 via data channel 110.

Data channel 110 may be a wireless channel, link, or other connection configured to transmit data between two devices. For example, data channel 110 may transmit data between debug device 108 and peripheral audio device 102. For example, during first debug mode 103B peripheral audio device 102 may transmit speech buffered from communications with main audio device 104, to debug device 108 via data channel 110. During second debug mode 103C, debug device 108 and peripheral audio device 102 may, for example, exchange test speech and processed test speech over data channel 110. Data channel 110 may also be used by debug device 108 to adjust parameters 111A-C.

In an example embodiment, data channel 110 may be a Bluetooth data channel, wherein debug device 108 and peripheral audio device 102 may both be Bluetooth compatible devices. For example, data channel 110 may be an asynchronous connectionless (ACL) channel. Data channel 110 may also be used, for example, to update the software or firmware of peripheral audio device 102, and receive information concerning the settings or parameters of peripheral audio device 102. In an example embodiment, debug device 108 may download updated software from the internet and may then update the software of peripheral audio device 102 via data channel 110. In another example embodiment, data channel 110 may connect more than two devices.

A tuning device may tune peripheral audio device 102 via data channel 110. For example, during first debug mode 103B and/or second debug mode 103C, debug device 108 may tune or adjust peripheral audio device 102 via data channel 110. The tuning may involve determining the settings of one or more audio processing parameters and adjusting those settings based on a compatibility of peripheral audio device 102 with its components and/or the characteristics of the audio processed by peripheral audio device 102, or to otherwise adjust or improve performance of peripheral audio device 102. For example, tuning peripheral audio device 102 may involve adjusting the values of parameters 111A-C. In another embodiment, the tuning may occur during operational mode 103A via voice channel 106. Data provided by debug device 108, including tuning and adjustments to peripheral audio device 102, may be received by antenna 112.

Some additional features of peripheral audio device 102 (FIG. 1) will now be briefly described. The features may be described in relation to the processing of speech, but it should be understood that speech is used for exemplary purposes only and that such functionality shall be deemed to apply to other types of audio, such as music, as well. Peripheral audio device 102 may include a wireless transceiver 114, according to an example embodiment.

Wireless transceiver 114 may be may be a device with a transmitter and a receiver that may wirelessly transmit and receive signals or waves. For example wireless transceiver 114 may transmit and receive audio signals, including speech signals, via antenna 112, over audio channel 106 and data channel 110. In an example embodiment, wireless transceiver 114 may be a Bluetooth compatible chip and may include a speech enhancement or processing capability. For example, wireless transceiver 114 may be a BCM2047 chip.

Antenna 112 may be coupled to wireless transceiver 114 and may be an antenna configured to transmit and receive wireless signals. For example, antenna 112 may transmit and receive data signals over data channel 110 and/or transmit and receive speech or other signals over voice channel 106.

According to an example embodiment, wireless transceiver 114 may include a baseband processor 116, audio enhancement logic 118 and a speech CODEC 120. Although not shown, wireless transceiver may include an RF front end to receive and demodulate wireless or RF signals, and the modulate signals onto a carrier or RF frequency for transmission. The demodulated signals may be input to baseband processor 116 for further processing.

Baseband processor 116 may receive and process speech and/or data signals from antenna 112 received via voice channel 106 or data channel 110. In an example embodiment, the speech and/or data signals may have frequency ranges close to zero. Baseband processor 116 may then output speech signals via data path 126A to be processed by audio enhancement logic 118. Baseband processor 116 may also receive processed speech signals or other signals from audio enhancement logic 118 via data path 126D, and may process and provide the speech to antenna 112 for transmission.

Audio enhancement logic 118 may process and/or enhance (hereinafter, process) audio signals or audio data, and may for example, include speech enhancement logic 118 to enhance speech signals. For example, peripheral audio device 102 may receive speech signals via voice channel 106 or test speech data via data channel 110, and then speech enhancement logic 118 may process the received speech or test speech data. Speech processing may include for example, echo cancellation, noise reduction, automatic volume boost/reduction, adjusting gain, noise dependent equalization and/or other speech processing. These are just a few examples of speech enhancement, and any type of speech processing or enhancement may be performed by speech enhancement logic 118. Speech enhancement logic 118 may also process speech received from a speech CODEC 120.

Speech CODEC 120 may perform speech coding and/or speech decoding. For example, speech CODEC 120 may receive (via data path 126B) and decode processed speech from speech enhancement logic 118 to be output to speaker 122. Likewise, audio or speech signals may be received via mic 124 and encoded by CODEC 120 to be output to speech enhancement logic 118 via data path 126C.

Speaker 122 may be a one-way audio device used to transmit a signal from a source audio device to a destination. For example, speaker 122 may be a speaker connected to speech CODEC 120 used to output the processed speech or other signals from speech CODEC 120. In an example embodiment, speech CODEC 120 may transmit decoded processed speech to speaker 122 which may project the speech in an audible format to a user. The user may then respond to the projected speech by speaking into mic 124. In an example embodiment, the user may be a human or a device capable of receiving and/or responding to speech.

Mic 124 may be a microphone used to capture audio such as speech. For example, a user may speak into mic 124, mic 124 may then capture the speech and provide the speech signals to speech CODEC 120 for processing. Speech CODEC 120 may then encode the speech, speech enhancement logic 118 may process the speech and baseband processor 116 may provide the speech to antenna 112 for wireless transmission via voice channel 108 and/or data channel 110. In another example embodiment, mic 124 may be device used to capture a signal containing speech over a wireless channel. For example speaker 122 and/or mic 124 may be replaced by a second antenna 112 configured to communicate via a voice channel 106 and/or a data channel 110.

Data paths 126A, B, C, and D may transmit or couple audio signals (e.g., music signals, speech signals, or other audio signals) and/or data between audio processing components. For example data paths 126A-D may transmit speech between baseband processor 116, speech enhancement logic 118 and speech CODEC 120. Data paths 126A-D may be connections or links used to transmit speech and/or data from one speech processing component to another. For example, data path 126A may transmit data received via data channel 110 from baseband processor 116 to speech enhancement logic 118. Then for example, data path 126C for example may carry speech received via mic 124 from speech CODEC 120 to speech enhancement logic 118. The speech and/or data carried by data paths 126A-D may be stored in a memory 128 before and/or after transmission by data paths 126A-D. For example, data paths 126A-D may be accessed via a set of registers or memory locations, e.g., one register or memory location to buffer signals at each data paths 126A-D. For example, signals provided on data paths may be read via the set of four registers or memory locations, and audio signals may be injected or input to the data paths 126A-D via the four registers or memory locations, for example. This may allow another device, such as debug device 108, to read or obtain signals on data paths 126 A-D and/or to inject or input test audio signals to be processed into one or more of data paths 126A-D.

Memory 128 may be a memory unit or storage device used to store audio and/or data, or other information. Memory 128 may store speech, including data and speech-related data, received and/or processed by peripheral audio device 102. For example memory 128 may store speech and/or data prior to and/or after transmission via data paths 126A-D. For example, memory 128 may store data received via data channel 110 upon receipt by baseband processor 116 but prior to transmission via data path 126A to speech enhancement logic 118. Memory 128 may then capture the data after processing by audio enhancement logic 118 but prior to transmission via data path 126B. Memory 128 may capture the audio and/or data in any stage of audio processing by peripheral audio device 102. Memory 128 may then provide the stored speech and/or other audio to debug device 108 via data channel 110, so debug device 108 may debug peripheral audio device 102 and adjust parameters 111A-C based at least in part on an analysis of the stored speech.

In an example embodiment, debug device 108 may provide test data (such as test speech data or speech signals) to memory 128 via data channel 110 for injection into peripheral audio device 102. In another example embodiment, debug device 108 may provide another type of audio test data such as music to memory 128. Then for example, memory 128 may provide the test speech to any component of peripheral audio device 102. For example, memory 128 may provide the test speech data to baseband processor 116, memory 128 may then store the processed test speech data after transmission along data path 126A. Debug device 108 may then for example read the processed test speech data from memory 128 (e.g., via data paths 126B and/or 126D) to determine how to adjust one or more speech parameters, such as one or more or parameters 111A, 111B or 111C, if necessary.

Figure 2:
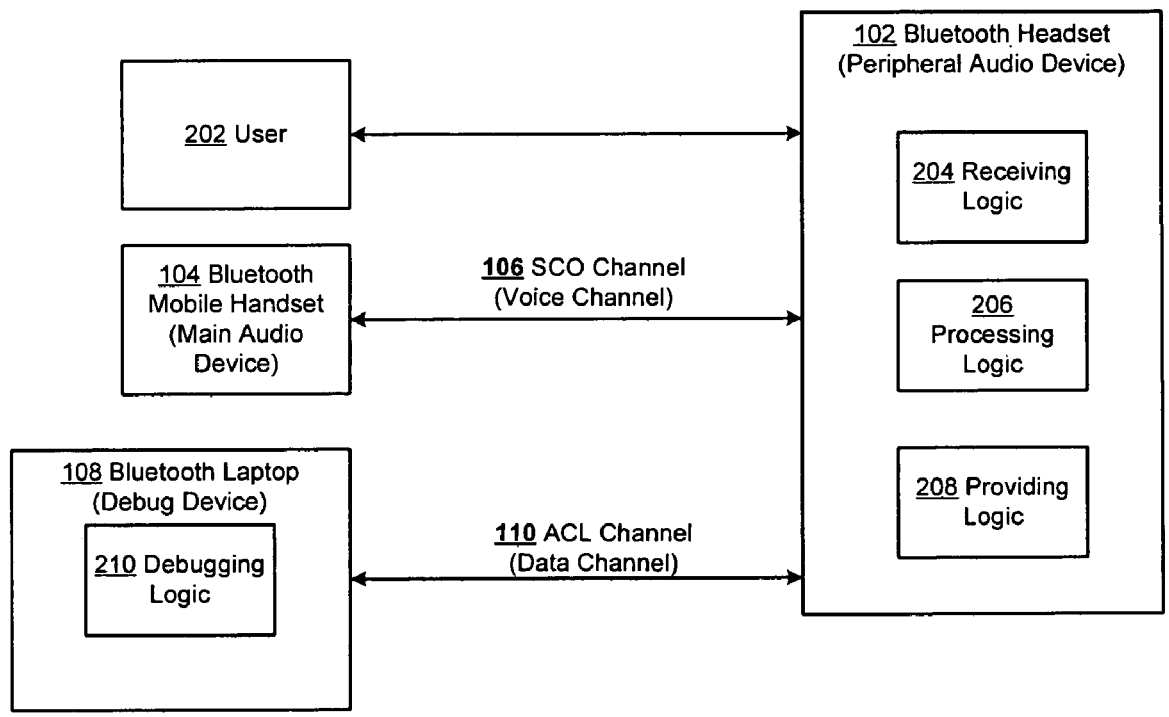
FIG. 2 is a block diagram illustrating an example system 200 for real-time monitoring and controlling for audio devices, according to an example embodiment.

FIG. 2 is a block diagram illustrating an example system 200 for real-time monitoring and controlling for audio devices, according to an example embodiment. Blocks 102, 104, 106, 108 and 110 as shown in system 200 of FIG. 2 may be the same or substantially the same as those blocks as described above for FIG. 1. System 200 may be a system configured to operate in first debug mode 103B of FIG. 1, according to an example embodiment.

In system 200, Bluetooth mobile handset 104 may be an example embodiment of main audio device 104 of FIG. 1. Bluetooth mobile handset 104 may be a Bluetooth compatible mobile phone handset configured to exchange speech and speech-related data with Bluetooth headset 102, which may be an example embodiment of peripheral audio device 102 of FIG. 1. Although many of the examples referred to in association with FIG. 2 may be described in the example context of speech and speech processing, it should be understood that these are exemplary only and such features may be applicable to other types of audio and audio processing as well, such as music or other audio signals. Bluetooth mobile handset 104 may communicate with Bluetooth headset 102 via SCO Channel 106, which may be an example embodiment of voice channel 106 of FIG. 1. The example embodiment of system 200 may include devices compliant with the Bluetooth standard. However according to another example embodiment, the system 200 may adhere to another wireless standard.

In an example embodiment, a user 202 may use Bluetooth headset 102 to communicate with Bluetooth mobile handset 104. User 202 may be a person, automated response system, or other user that may use Bluetooth headset 102. For example, user 202 may speak into Bluetooth headset 102, Bluetooth headset 102 may then receive and process the speech from user 202 and provide it to Bluetooth mobile handset 104.

Receiving logic 204 may capture or receive speech provided to Bluetooth headset 102. For example, receiving logic 204 may capture speech from user 202 who make speak into a microphone or other speech capturing mechanism of Bluetooth headset 102. Receiving logic 204 may also receive speech signals and speech-related data transmitted from Bluetooth mobile handset 104 via SCO channel 106. In an example embodiment, receiving logic 204 may include antenna 112, baseband processor 116, speech CODEC 120 and/or mic 124 of FIG. 1. After capturing the speech, receiving logic 204 may then provide the speech to processing logic 206.

Processing logic 206 may enhance and/or process speech received by an audio device or user. For example, processing logic 206 may enhance speech received by receiving logic 204 of Bluetooth headset 102. Speech enhancement may include for example, echo cancellation, noise reduction, automatic volume boost/reduction, adjusting gain, noise dependent equalization and/or other speech processing. For example, speech received over SCO 106 may contain an echo, thus processing logic 206 may cancel out the echo. In an example embodiment, processing logic 206 may include speech enhancement logic 118, memory 128, and/or speech CODEC 120, and possibly other circuits or logic not shown.

Providing logic 208 may provide processed speech to a destination audio device or user. For example, providing logic 208 may provide speech, as received from Bluetooth mobile handset 104 and after enhancement by processing logic 206, in an audible format to user 202. Providing logic 208 may also provide speech originating from user 202 to Bluetooth mobile handset 104. In an example embodiment, providing logic 208 may include antenna 112, baseband processor 116, speech CODEC 120 and/or speaker 122 of FIG. 1.

In an example embodiment, the processed speech, as provided by Bluetooth headset 102 to user 202 and/or Bluetooth mobile handset 104, may include undesired speech characteristics. For example, the speech may be 'fuzzy,' include extraneous noise, or have another problem. In an example embodiment, Bluetooth headset 102 may then be placed into a debug mode by pushing one or more buttons (not shown) on Bluetooth headset 102. In another example embodiment, Bluetooth headset 102 may already be operating in a debug mode, or may enter a debug remotely through a wireless command.

During debug mode, Bluetooth headset 102 may buffer or store the speech signals it receives, processes, and/or outputs. The buffered speech may include, for example, speech, including speech data, as received by receiving logic 204 and the speech as processed by processing logic 206. Then for example, providing logic 208 may provide the buffered speech via ACL channel 110 to Bluetooth laptop 108.

Bluetooth laptop 108, which may be an example embodiment of debug device 108 of FIG. 1, adjust parameters associated with Bluetooth headset 102. For example, Bluetooth laptop 108 may receive the buffered speech from Bluetooth headset 102. Bluetooth laptop 108 may then for example determine the settings of Bluetooth headset 102 and adjust them based at least in part on an analysis of the buffered speech. In another example embodiment, Bluetooth laptop 108 may provide test speech to Bluetooth headset 102, and may receive the test speech after undergoing processing by processing logic 206 for analysis.

Debugging logic 210 may analyze speech to determine how to adjust the audio device providing the speech. For example, Bluetooth laptop 108 may receive buffered speech from Bluetooth headset 102 and may analyze the speech to determine how to adjust Bluetooth headset 102 to improve the quality of the speech. Debugging logic 210 may determine the initial settings of one or more speech processing parameters of Bluetooth headset 102, determine an adjustment that needs to be made to one or more of the parameters, and provide the adjustment via a control signal sent by Bluetooth laptop 108 via ACL channel 110.

ACL channel 110, which may be an example embodiment of data channel 110 of FIG. 1, may be a Bluetooth wireless connection between Bluetooth headset 102 and Bluetooth laptop 108 configured to transmit data. For example, ACL channel 110 may transmit a control signal from Bluetooth laptop 108 to Bluetooth headset 102, wherein the control signal is configured to adjust one or more settings of Bluetooth headset 102.

Figure 3:
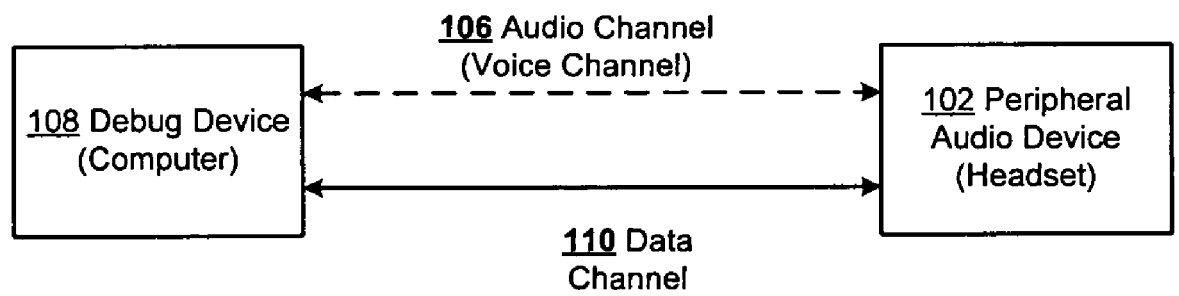
FIG. 3 is a block diagram illustrating an example system 300 for monitoring and controlling an audio device, according to an example embodiment.

FIG. 3 is a block diagram illustrating an example system 300 for monitoring and controlling for audio devices, according to an example embodiment. Blocks 102, 106, 108 and 110 as shown in system 300 of FIG. 3 may be the same or substantially the same as those blocks as described above for FIG. 1. System 300 may be a system configured to operate in the second debug mode 103C of FIG. 1.

Peripheral audio device 102 may be an audio device capable of bi-lateral audio and data communication. For example peripheral audio device 102 may be a headset with a speech processing and/or enhancement capability, or other device. Peripheral audio device 102 may receive, transmit, and process speech received from another audio device or user. Although many of the examples referred to in association with FIG. 3 are mainly in the context of speech and speech processing, it should be understood that these are exemplary only and such features may be applicable to other types of audio and audio processing as well, including but not limited to music.

During a debug mode, peripheral audio device 102 may receive test speech signals such as speech data, via a data channel 110. Data channel 110 may be a wireless channel, e.g. such as a Bluetooth compatible channel, configured to transmit data between two devices, such as peripheral audio device 102 and debug device 108.

Debug device 108 may be a device configured to debug the audio or speech components of peripheral audio device 102 that perform speech processing. For example, debug device 108 may provide test speech to peripheral audio device 102 via data channel 110. Peripheral audio device 102 may then process the test speech signals and then provide or transmit these processed speech signals back to debug device 108. Then for example, debug device 108 may, based on an analysis of the processed speech signals received from peripheral audio device 102, adjust or tune peripheral audio device 102 to improve or adjust its speech processing. In an example embodiment, the analysis of the processed speech may include comparing the received processed speech to the provided speech and/or an expected processed speech. Then for example, debug device 108 may adjust peripheral audio device 102 via data channel 110 accordingly.

In an example embodiment, debug device 108 may communicate with peripheral audio device 102 using voice channel 106. Voice channel 106 may be a wireless channel, such as a Bluetooth compatible channel, configured to carry speech signals between debug device 108 and peripheral audio device 102. Then for example, debug device 110 may provide speech signals via voice channel 106 and receive the processed speech signals as buffered by peripheral audio device 102 over data channel 110. In another example embodiment, debug device 108 may tune or adjust peripheral audio device 102 via voice channel 106 and/or data channel 110.

Figure 4:
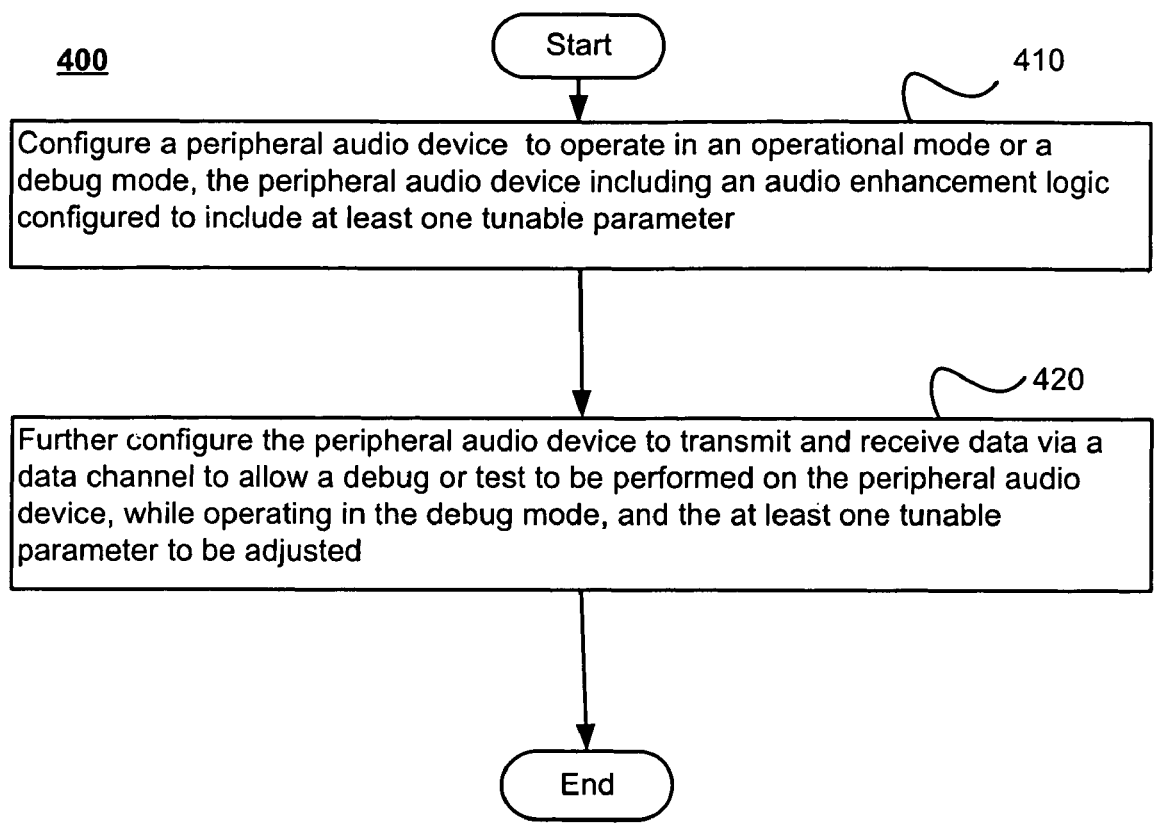
FIG. 4 is a flow chart illustrating real-time monitoring and controlling for audio devices according to an example embodiment.

FIG. 4 is a flow chart illustrating real-time monitoring and controlling for audio devices according to an example embodiment. At 410, a peripheral audio device may be configured to operate in an operational mode or a debug mode, the peripheral audio device including an audio enhancement logic configured to include at least one tunable parameter. For example, peripheral audio device 102 may include mode of operation 103, including operation mode 103A, first debug mode 103B, and second debug mode 103C. Peripheral audio device 102 may also include audio enhancement logic 118, including parameter 111B.

At 420, the peripheral audio device may be configured to transmit and receive data via a data channel to allow a debug or test to be performed on the peripheral audio device, while operating in the debug mode, and the at least one tunable parameter to be adjusted. For example peripheral audio device 102 may transmit and receive data via data channel 110 to allow a debug or test to be performed on peripheral audio device 102, while operating in first debug mode 103B or second debug mode 103C, wherein parameters 111A-C may be adjusted.

Figure 5:
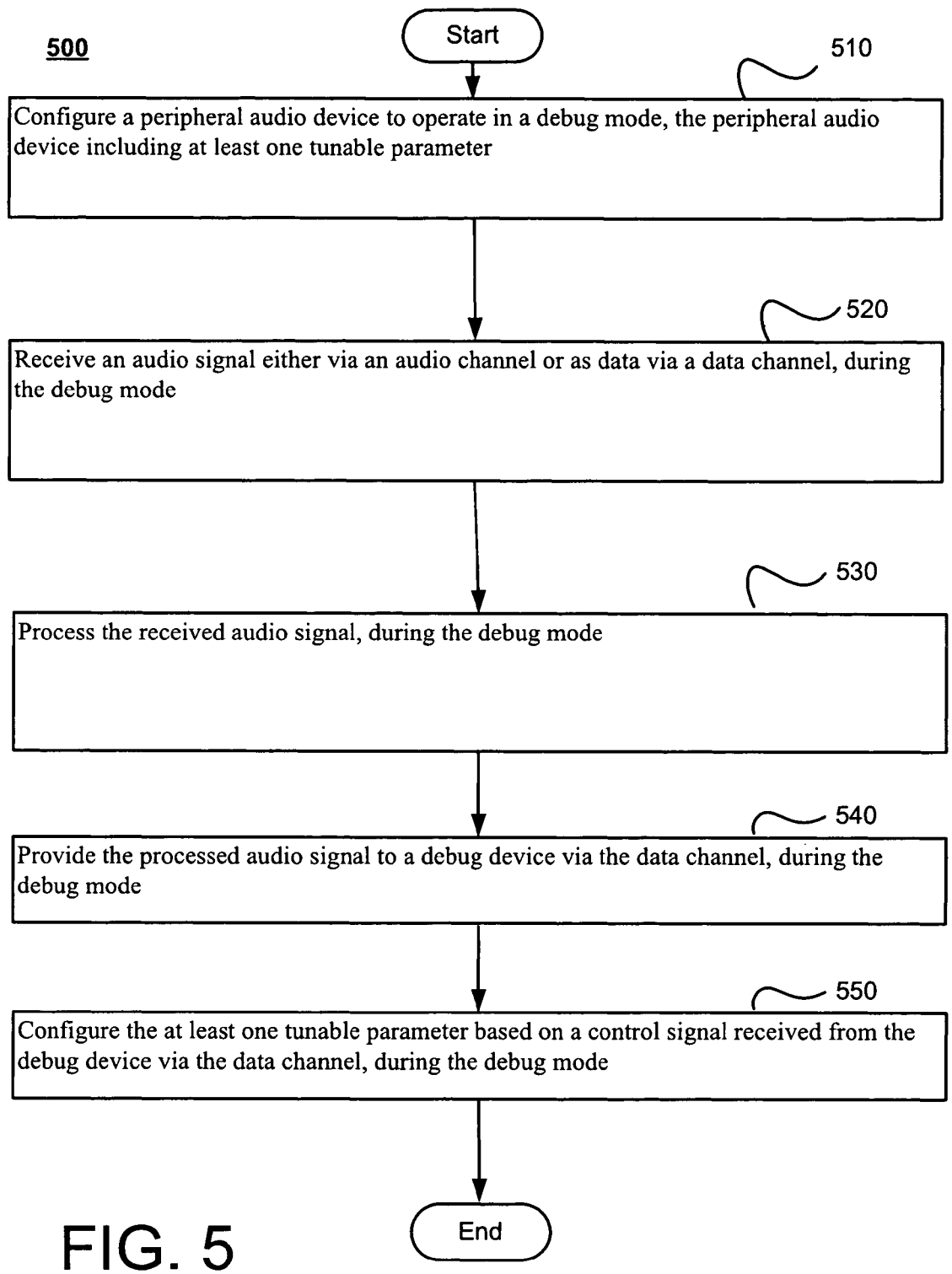
FIG. 5 is a flow chart illustrating real-time monitoring and controlling for audio devices according to an example embodiment.

FIG. 5 is a flow chart illustrating real-time monitoring and controlling for audio devices according to an example embodiment. At 510, a peripheral audio device may be configured to operate in a debug mode, the peripheral audio device including at least one tunable parameter. For example, peripheral audio device 102 may include parameters 111A-C and may operate in first debug mode 103B or second debug mode 103C.

At 520, an audio signal may be received either via an audio channel or as data via a data channel, during the debug mode. For example, peripheral audio device 102 may receive an audio signal, such as a speech signal, via audio channel 106 or a data signal via data channel 110 to antenna 112.

At 530, the received audio signal may be processed, during the debug mode. For example, baseband processor 116, audio enhancement logic 118 and/or speech CODEC 120 may all process the audio (e.g., speech) received by antenna 112.

At 540, the processed audio signal may be provided to a debug device via the data channel, during the debug mode. For example, peripheral audio device 102 may provide the audio signal via data channel 110 to debug device 108.

At 550, the at least one tunable parameter may be configured based on a control signal received from the debug device via the data channel, during the debug mode. For example, debug device 108 may provide a control signal via data channel 110 to adjust any one or more of parameters 111A,B,C.

Figure 6:
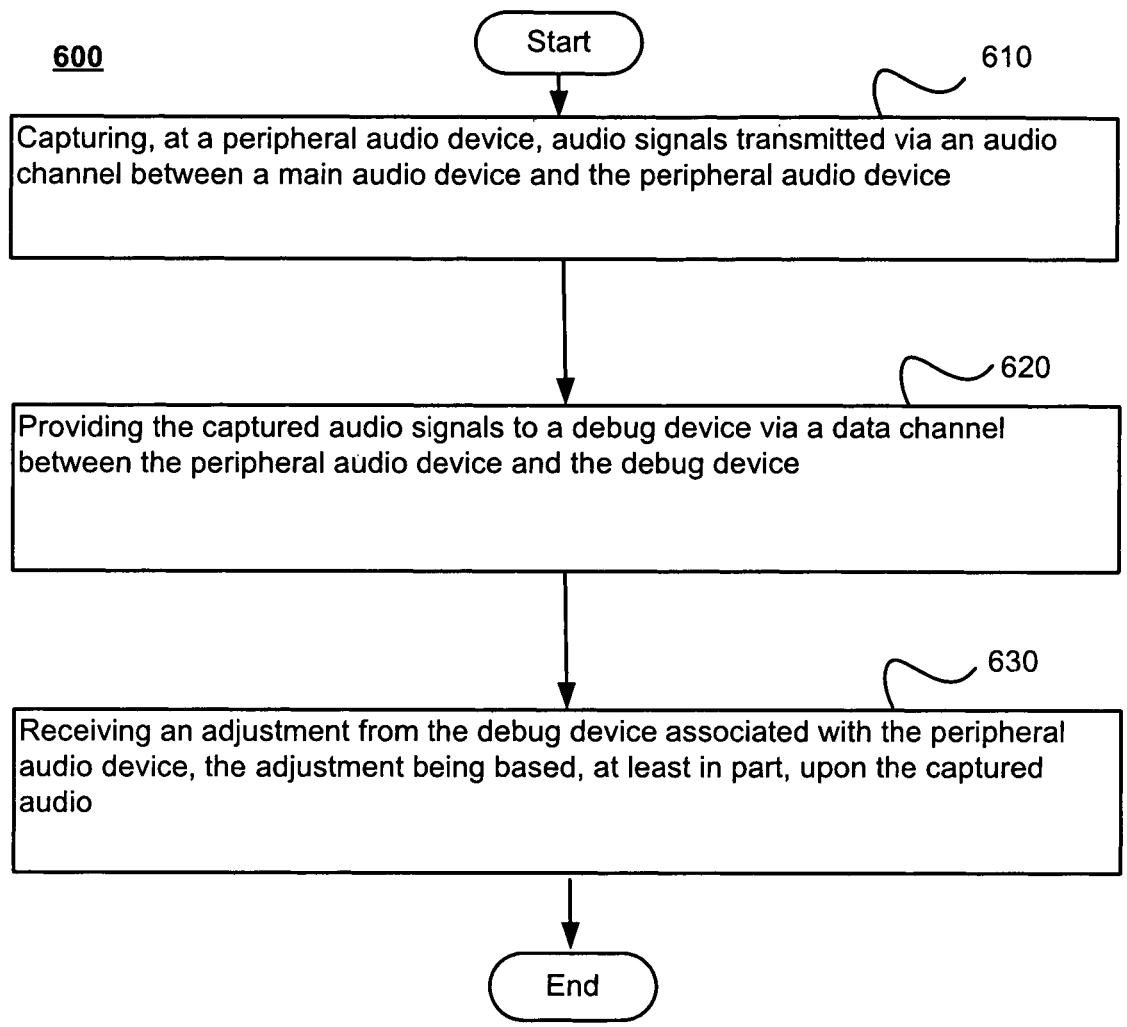
FIG. 6 is a flow chart illustrating real-time monitoring and controlling for audio devices according to an example embodiment.

FIG. 6 is a flow chart illustrating real-time monitoring and controlling for audio devices according to an example embodiment. At 610, audio signals transmitted via an audio channel between a main audio device and a peripheral audio device may be captured at the peripheral audio device. For example, peripheral audio device 102 may capture audio signals transmitted via audio channel 106 between main audio device 104 and peripheral audio device 102. In an example embodiment, the audio signals may be received at antenna 112, processed by baseband processor 116 and stored in memory 128.

At 620, the captured audio signals may be provided to a debug device via a data channel between the peripheral audio device and the debug device. For example, captured audio signals may be provided to debug device 108 via data channel 110.

At 630, an adjustment may be received from the debug device associated with the peripheral audio device, the adjustment being based, at least in part, upon the captured audio. For example, peripheral audio device 102 may receive a control signal via data channel 110 from debug device 108, wherein the control signal includes an adjustment of parameters 111A-C, based on the audio, such as speech, received via data channel 110.

While certain features of the described implementations have been illustrated as described herein, many modifications, substitutions, changes and equivalents will now occur to those skilled in the art. For example, many of the described implementations refer to single components of a system, when in other implementations multiple such components may exist within the system and those components may work in series and/or in parallel. Also for example, many of the described implementations and embodiments refer to speech, speech-related data, and speech processing, when in other implementations or embodiments such examples may be extended to include other types of audio, audio-related data and audio processing as well. It is, therefore, to be understood that the appended claims are intended to cover all such modifications and changes as fall within the true spirit of the embodiments of the invention.

What is claimed is:

1. An apparatus comprising:
    a peripheral audio device configured to operate in an operational mode or a debug mode, the peripheral audio device including a transceiver configured to transmit and receive data via a data channel and an audio enhancement logic configured to include at least one tunable parameter; and
    wherein the peripheral audio device, while operating in the debug mode, is further configured to receive an audio signal either via an audio channel or as data via a data channel from a debug device, process the received audio signal, and provide the processed audio signal to the debug device via the data channel.

2. The apparatus of claim 1 wherein the audio enhancement logic comprises speech enhancement logic and the peripheral audio device is further configured to transmit and receive at least speech signals via a voice channel while operating in the operational mode.

3. The apparatus of claim 1 wherein the peripheral audio device is further configured to buffer at least audio signals via an audio channel while operating in the debug mode and provide the buffered signals to the debug device via the data channel.

4. The apparatus of claim 1 wherein the peripheral audio device is further configured to be tuned via the data channel, wherein the tuning comprises tuning or adjusting the at least one tunable parameter.

5. The apparatus of claim 1 wherein the peripheral audio device further comprises a switch or logic that may be actuated to select the operational mode or the debug mode.

6. The apparatus of claim 1 wherein the peripheral audio device is configured to transmit and receive data via a Bluetooth Asynchronous Connection-less (ACL) channel while operating in the debug mode, and is further configured to transmit and receive audio signals via a Bluetooth Synchronous Connection-Oriented (SCO) channel or enhanced SCO (eSCO) channel while operating in the debug and/or operational mode.

7. The apparatus of claim 1 wherein the peripheral audio device comprises a Bluetooth compatible audio headset.

8. The apparatus of claim 1 wherein the peripheral audio device comprises:
 a programmable baseband processor;
 the audio enhancement logic comprising speech enhancement logic configured to process, based on the at least one tunable parameter, at least speech signals received via a voice channel and/or data received via the data channel, depending on a mode of operation;
 a memory coupled to the speech enhancement logic, the memory configured to store the at least one tunable parameter, the received at least speech signals and/or the received data; a speech CODEC; and
 at least one of a speaker and a microphone.

9. The apparatus of claim 1 wherein the peripheral audio device further comprises a plurality of test registers configured to allow the debug device, via the data channel during the debug mode, to input the data into the peripheral audio device and to receive the processed data.

10. The apparatus of claim 1 wherein the peripheral audio device is further configured to configure the at least one tunable parameter based on a control signal received from the debug device via the data channel.

11. A method comprising:
 configuring a peripheral audio device to operate in a debug mode, the peripheral audio device including at least one tunable parameter;
 performing the following during debug mode:
 receiving an audio signal either via an audio channel or as data via a data channel from a debug device;
 processing the received audio signal;
 providing the processed audio signal to the debug device via the data channel; and
 configuring the at least one tunable parameter based on a control signal received from the debug device via the data channel.

12. The method of claim 11 the performing comprising the receiving comprises:
 receiving the audio signal, wherein the audio signal comprises speech and/or speech associated data, via the audio channel or as data via the data channel.

13. The method of claim 11 wherein the performing comprising:
 receiving speech signals via a voice channel;
 processing the received signals;
 buffering the received speech signals and/or the processed speech signals during debug mode; and
 providing the buffered signals via the data channel to the debug device.

14. The method of claim 11 wherein the configuring the at least one tunable parameter based on the control signal received via the data channel comprises receiving updated firmware or software for the peripheral audio device.

15. The method of claim 11 and further comprising:
 providing information regarding a state of the peripheral audio device in response to a request.

16. A method comprising:
 capturing, at a peripheral audio device, audio signals transmitted via an audio channel between a communication device and the peripheral audio device;
 providing the captured audio signals to a debug device via a data channel between the peripheral audio device and the debug device; and
 receiving an adjustment from the debug device associated with the peripheral audio device, the adjustment being based, at least in part, upon the captured audio.

17. The method of claim 16 comprising:
 capturing the audio signals transmitted via a synchronous voice channel between the main audio device and the peripheral audio device, wherein the audio signals comprise speech and/or speech-related data; and
 providing the captured audio signals to the debug device via an asynchronous data channel between the peripheral audio device and the debug device.

18. The method of claim 16 wherein the capturing comprises:
 capturing the audio signals received by the peripheral audio device, prior to transmission to the main audio device and/or after transmission from the main audio device.

19. The method of claim 16 wherein the capturing comprises:
 buffering speech signals in one or more stages of speech processing by the peripheral audio device.

20. The method of claim 16 wherein the receiving comprises:
 tuning the peripheral audio device based on the adjustment.

21. The method of claim 16 wherein the communication device is a cellular phone.

22. An apparatus comprising:
 a peripheral audio device configured to operate in an operational mode or a debug mode, the peripheral audio device including a transceiver configured to transmit and receive data via a data channel; and
 wherein the peripheral audio device, while operating in the debug mode, is further configured to capture audio signals transmitted via an audio channel between a communication device and the peripheral audio device, provide the captured audio signals to a debug device via a data channel between the peripheral audio device and the debug device, and receive an adjustment from the debug device associated with the peripheral audio device, the adjustment being based, at least in part, upon the captured audio.

23. The apparatus of claim 22 wherein the communication device is a cellular phone.

* * * * *